United States Patent
Brekke

(10) Patent No.: US 9,353,907 B1
(45) Date of Patent: May 31, 2016

(54) MOUNTING BRACKET FOR OUTDOOR EQUIPMENT

(71) Applicant: Brent Brekke, Atwater, MN (US)

(72) Inventor: Brent Brekke, Atwater, MN (US)

(*) Notice: Subject to any disclaimer, the term of this patent is extended or adjusted under 35 U.S.C. 154(b) by 0 days.

(21) Appl. No.: 14/843,133

(22) Filed: Sep. 2, 2015

Related U.S. Application Data

(60) Provisional application No. 62/044,493, filed on Sep. 2, 2015.

(51) Int. Cl.
*F16M 13/00* (2006.01)
*G03B 17/56* (2006.01)
*F16M 13/02* (2006.01)

(52) U.S. Cl.
CPC ........... *F16M 13/022* (2013.01); *G03B 17/561* (2013.01)

(58) Field of Classification Search
CPC ........................... G03B 17/561; F16M 13/022
See application file for complete search history.

(56) References Cited

U.S. PATENT DOCUMENTS

| | | | | |
|---|---|---|---|---|
| 6,188,849 | B1 * | 2/2001 | Staicouras | F16M 13/04 396/421 |
| 8,087,626 | B1 * | 1/2012 | Weeden | F16M 11/14 248/218.4 |
| 8,109,680 | B2 * | 2/2012 | Olien | F16M 11/041 396/428 |
| 8,157,225 | B2 * | 4/2012 | Kephart | F16M 11/04 248/177.1 |
| 8,297,857 | B2 * | 10/2012 | Schippers | F16M 11/10 396/428 |
| 8,346,070 | B2 * | 1/2013 | Beasley | G03B 15/006 348/373 |
| 2008/0107413 | A1 * | 5/2008 | Moore | G03B 17/561 396/428 |

* cited by examiner

*Primary Examiner* — W B Perkey
(74) *Attorney, Agent, or Firm* — Peter J. Ims; Westman, Champlin & Koehler, P.A.

(57) ABSTRACT

A mounting bracket includes a main body having a continuous side wall that defines an interior cavity configured to engage a support member therein. The continuous side wall includes at least one aperture configured to accept an engaging mechanism configured to frictionally engage the support member. The mounting bracket includes a substantially horizontal mounting plate attached to the main body. The substantially horizontal mounting plate has a first aperture spaced from the main body wherein the first aperture is configured to accept a retaining mechanism configured to engage a device.

20 Claims, 11 Drawing Sheets

MOUNTING BRACKET FOR OUTDOOR EQUIPMENT

CROSS REFERENCE TO RELATED APPLICATION(S)

The present application claims the benefit of U.S. Provisional Patent Application Ser. No. 62/044,493 entitled MOUNTING BRACKET FOR OUTDOOR CAMERA that was filed on Sep. 2, 2014, the contents of which are incorporated by reference in its entirety.

BACKGROUND

The present disclosure relates to a mounting bracket that can be utilized outdoors. More particularly, the present disclosure relates to a universal mounting bracket for mounting equipment outdoors, including an outdoor still shot camera or a video camera.

Many people who are interested in wildlife and/or tracking the movements of wild animals utilize cameras to detect the species of animals that inhabit a certain area as well as to monitor the movement of the wildlife. One way of identifying species of wildlife which inhabit an area as well as track the wildlife's movement is to utilize cameras that either takes a still shot photograph or a video when movement is detected.

Typically, these outdoor cameras are mounted to trees or posts that are permanently located within the area. However, the tree and/or post may not be in an ideal location to position a camera near a path, or other desired location, due to obstructions and/or the diameter of the tree trunk or the limbs of the tree.

Typically, the cameras are mounted utilizing a strap that retains the cameras to the post or tree. Alternatively, in the event that a mounting bracket is available for a certain camera, the mounting bracket is made specifically for that particular camera and can be quite expensive and compatible with only that certain make or model.

SUMMARY

The present disclosure relates to a mounting bracket for mounting a device, typically outdoors. The mounting bracket includes a main body having a substantially continuous side wall that extends from a bottom end to a top end. The main body includes an interior cavity that is defined by interior surfaces of the side walls where the interior cavity extends from the bottom end to the top end. The interior cavity is of a size to position the main body about a stake, a fence post or a tree limb, among other support members. The side walls include aligned apertures in a front portion of the side wall and a back portion of the side wall such that securing mechanisms can be inserted there-through to retain the main body to the support. The interior cavity is of a size to position the main body about a stake, a fence post or a tree limb, among other support members. The side walls include aligned apertures in a front portion of the side wall and a back portion of the side wall such that securing mechanisms can be inserted therethrough to retain the main body to the support. A substantially horizontal mounting plate extends from the top end of the main body. A substantially horizontal plane that intersects with the substantially horizontal mount plate is substantially perpendicular to a longitudinal axis of the main body. The substantially horizontal mounting plate includes a first aperture spaced from the main body where the aperture is configured to allow a securing mechanism to be inserted therethrough and secure the device to the substantially horizontal mounting plate.

Another aspect of the present disclosure relates to a mounting bracket for mounting a device, typically outdoors. The mounting bracket includes a main body having a substantially continuous side wall that extends from a bottom end to a top end. The main body includes an interior cavity that is defined by interior surfaces of the side walls where the interior cavity extends from the bottom end to the top end. The interior cavity is of a size to position the main body about a T-post that has been secured in a selected location. The interior cavity is substantially square in cross-section and is sized to position the main body about the T-post. The main body is rotated a quarter turn to cause a friction engagement with the side edges of the T-post to retain the mounting bracket in a selected position without requiring any tools or additional securing mechanisms. The side walls include aligned apertures in a front portion of the side wall and a back portion of the side wall such that securing mechanisms can be inserted therethrough to retain the main body to the support. A substantially horizontal mounting plate extends from the top end of the main body. A substantially horizontal plane that intersects with the substantially horizontal mount plate is substantially perpendicular to a longitudinal axis of the main body. The substantially horizontal mounting plate includes a first aperture spaced from the main body where the aperture is configured to allow a securing mechanism to be inserted therethrough and secure the device to the substantially horizontal mounting plate.

The present disclosure relates to a mounting bracket for mounting a device, typically outdoors. The mounting bracket includes a main body having a substantially continuous side wall that extends from a bottom end to a top end. The main body includes an interior cavity that is defined by interior surfaces of the side walls where the interior cavity extends from the bottom end to the top end. The interior cavity is of a size to position the main body about a T-post that has been secured in a selected location. The interior cavity is substantially square in cross-section and is sized to position the main body about the T-post. The main body is rotated a quarter turn to cause a friction engagement with the side edges of the T-post to retain the mounting bracket in a selected position without requiring any tools or additional securing mechanisms. The side walls include aligned apertures in a front portion of the side wall and a back portion of the side wall such that securing mechanisms can be inserted there-through to retain the main body to the support. A substantially horizontal mounting plate extends from the top end of the main body. A substantially horizontal plane that intersects with the substantially horizontal mount plate is substantially perpendicular to a longitudinal axis of the main body. The substantially horizontal mounting plate includes a first aperture spaced from the main body where the aperture is configured to allow a securing mechanism to be inserted there-through and secure the device to the substantially horizontal mounting plate. A substantially vertical mounting plate extends from a distal end of the substantially horizontal mounting plate to form a substantially "J" shaped configuration. The substantially vertical mounting plate includes a second aperture configured to allow a securing mechanism to be inserted therethrough and secure the device to the substantially vertical mounting plate.

Another aspect of the present disclosure relates to a mounting bracket for mounting a device, typically outdoors. The mounting bracket includes a main body having a substantially continuous side wall that extends from a bottom end to a top end. The main body includes an interior cavity that is defined by interior surfaces of the side walls where the interior cavity extends from the bottom end to the top end. The side walls include aligned apertures in a front portion of the side wall and a back portion of the side wall such that securing mechanisms can be inserted there-through to retain the main body to the support. A substantially horizontal mounting plate extends from the top end of the main body. A substantially horizontal plane that intersects with the substantially horizontal mount plate is substantially perpendicular to a longitudinal axis of the main body. The substantially horizontal mounting plate includes a first aperture spaced from the main body where the aperture is configured to allow a securing mechanism to be inserted there-through and secure the device to the substantially horizontal mounting plate. A substantially vertical mounting plate extends from a distal end of the substantially horizontal mounting plate to form a substantially "J" shaped configuration. The substantially vertical mounting plate includes a second aperture configured to allow a securing mechanism to be inserted there-through and secure the device to the substantially vertical mounting plate.

DETAILED DESCRIPTION

Figure 1:
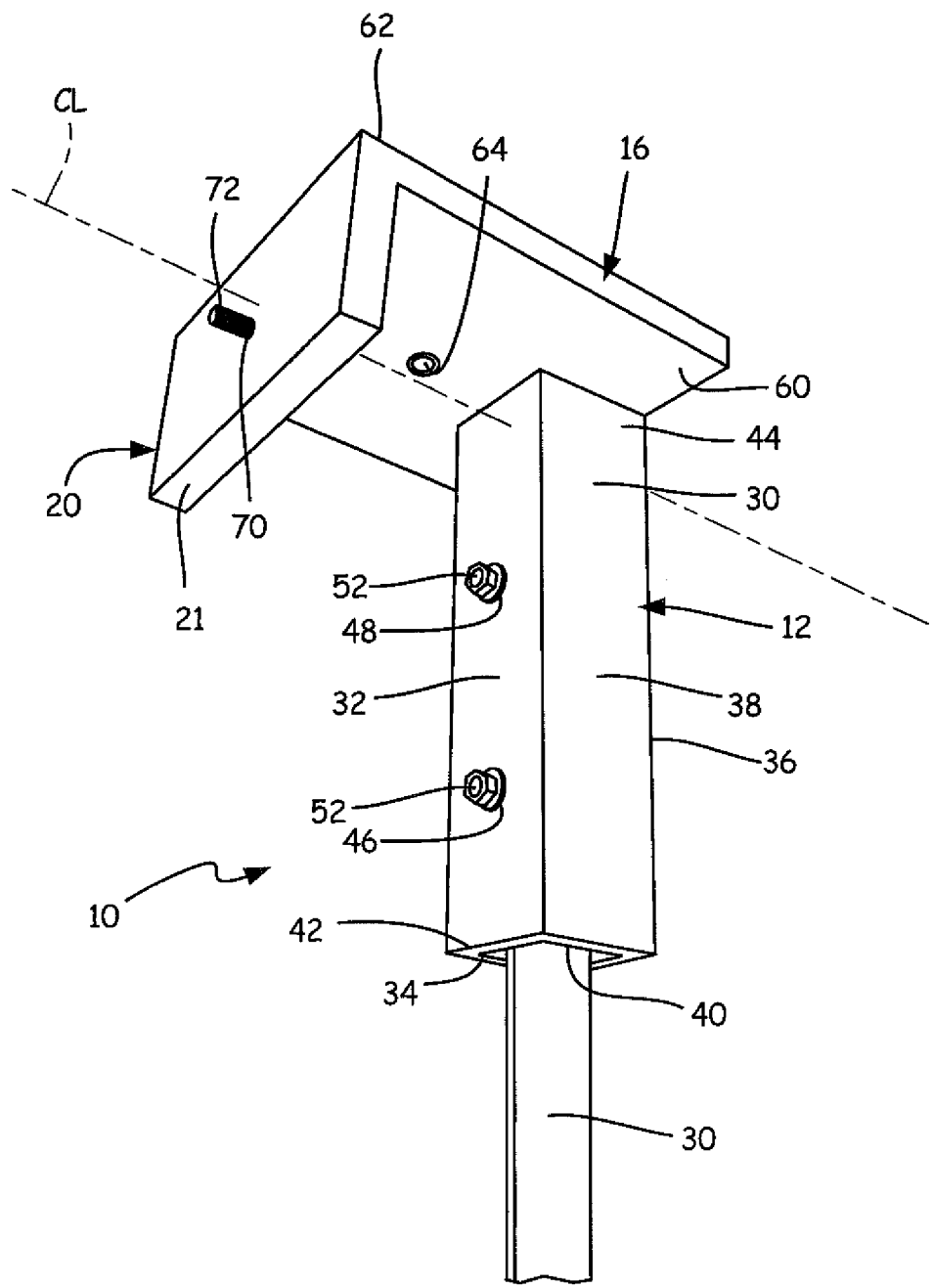
FIG. 1 is a perspective view of a mounting bracket.

A universal mounting bracket is generally depicted in FIG. 1 at 10. The universal mounting bracket 10 is configured to be attached to a support 30 such as but not limited to a post, T-post, limb, trunk of a tree, a board or any support of sufficient strength to support the mounting bracket 10 and at least one device. The universal mounting bracket 10 can be positioned about the support 30 and secured thereto with a frictional engagement or with securing mechanisms. The universal mounting bracket 10 can be secured to the support with securing mechanisms that extend through the mounting bracket 10 such that an external surface of the mounting bracket 10 is adjacent the support. The universal mounting bracket 10 can be utilized to secure and retain any suitable device including, but not limited to, a camera or a speaker.

The universal mounting bracket 10 includes a main body 12 and a substantially horizontal mounting plate 16 attached to a top end 44 of the main body 12. The top end 44 of the main body 12 is secured to the substantially horizontal mounting plate 16 such that an external surface 60 of a back wall portion 36 of the main body 12 is substantially even with a back edge surface 60 of the substantially horizontal mounting plate 16. With the back edge surface 60 substantially even with the external surface of the back wall portion 36, the mounting bracket 10 is configured to abut and be secured to a substantially flat surface of a support without placing stresses and strains on the mounting bracket 10.

Figure 2:
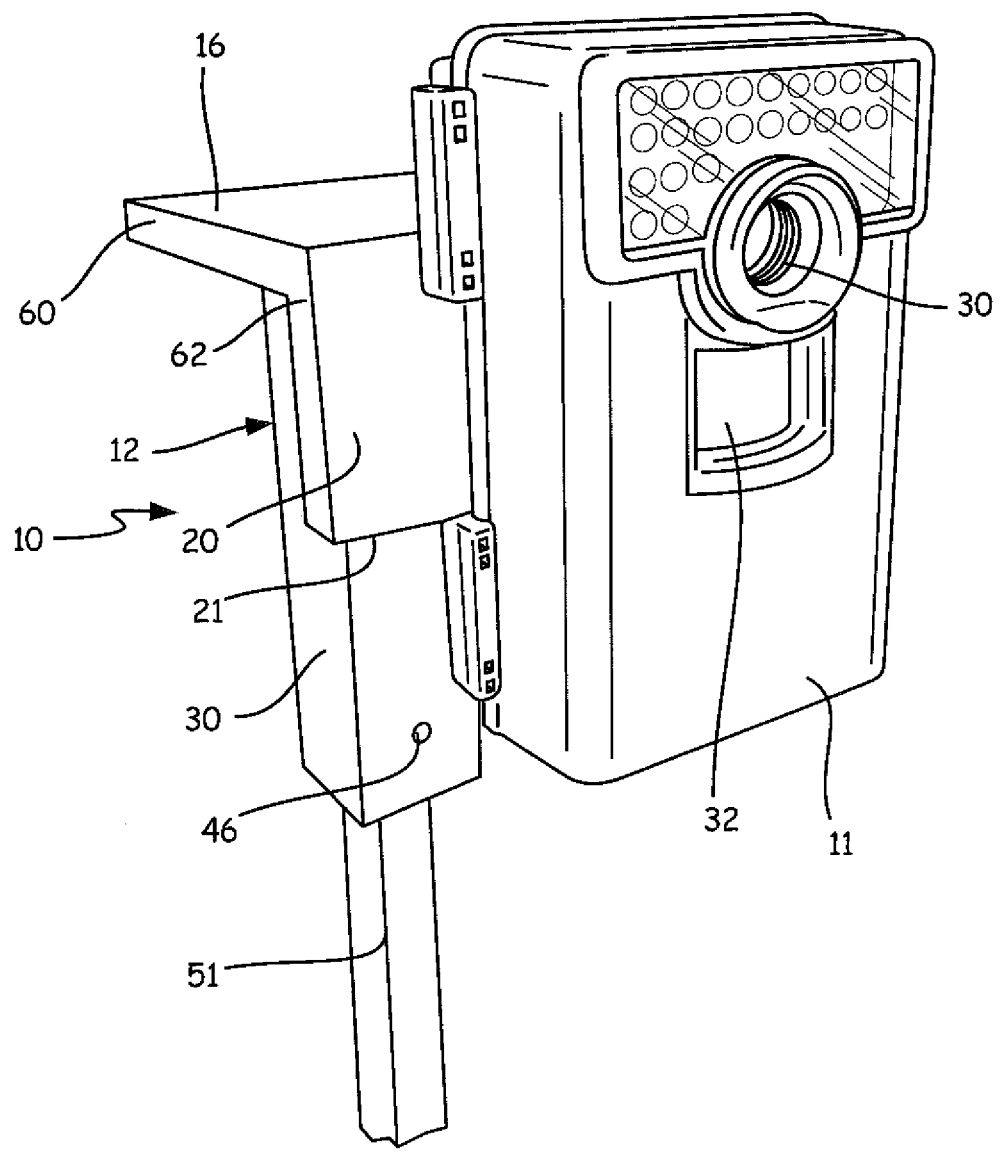
FIG. 2 is a perspective view of the mounting bracket having a camera secured thereto.

In one embodiment, the mounting bracket 10 includes a substantially vertical mounting plate 20 extending from a distal end 62 of the substantially horizontal mounting plate 16. As illustrated in FIG. 2, a camera 11 is secured to the substantially vertical mount plate 20 with a bolt that is positioned through an aperture in the substantially vertical mount plate 20 and into a threaded bus in the camera 11. The camera 11 can also be mounted to the substantially horizontal mounting plate 16 as well, depending on the desired position of the camera 11. It is also contemplated that a camera can be secured to the substantially horizontal mounting plate 16 and that a camera can be secured to the substantially vertical mount plate 20. While a camera is discussed herein, any suitable device can be secured to either the substantially horizontal mounting plate 16 or the substantially vertical mounting plate 20 or both. Further, the present disclosure is not limited to being used with a camera.

Referring to FIGS. 1 and 2, the main body 12 includes a continuous side wall 30 that includes a front wall portion 32 and the back wall portion 36 that are connected together with left and right side wall portions 34 and 38, respectively. The continuous side wall 30 defines an internal cavity 40 that extends from a bottom end 42 of the main body 12 to the top end 44. The internal cavity 40 is sized to accept a standard T-post 50 (as illustrated in FIG. 1) and stakes 51 (as illustrated in FIG. 2). A typical cross-sectional size of the internal cavity 42 is nominally two inches from side to side. However, the size of the main body 12 and the internal cavity 40 can be any desired size, and the present disclosure is not limited to the nominal two inch cross-sectional opening. While a main body 12 with a continuous side wall 30 with a substantially square perimeter is illustrated, other configurations of the side wall 30 are also contemplated, including but not limited to, a rectangle, a circle and an ellipse.

Figure 3:
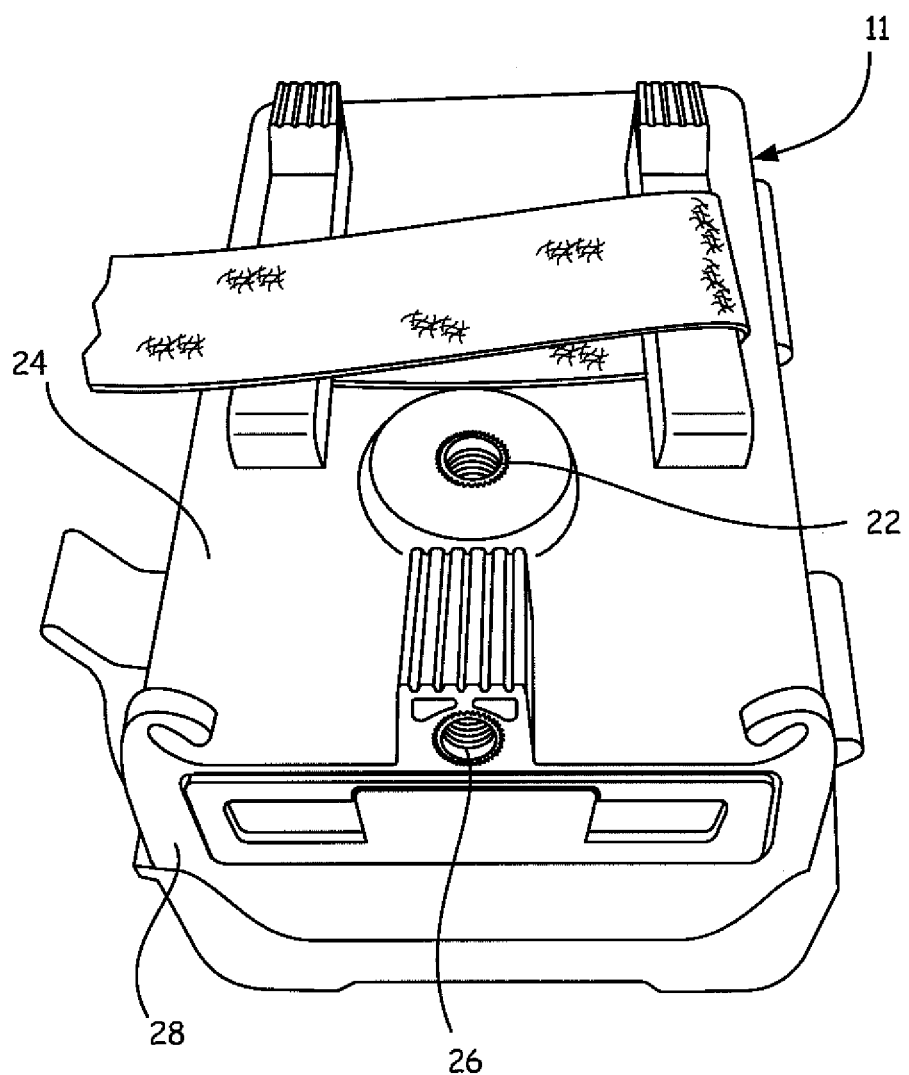
FIG. 3 is a perspective view of a typical camera having threaded mounting buses.

The front wall portion 32 and the back wall portion 36 include lower and upper apertures 46 and 48 that are sized to accept bolts or screws 52 as illustrated in FIG. 3. The upper aperture 48 and the lower aperture 46 are located below a distal edge surface 21 of the substantially vertical mounting plate 20 such that the upper and lower apertures 48 and 46, respectively, such that securing mechanism such as, but not limited to, bolts, nails and screws can be inserted there-through and manipulated with manual force or a tool without interference from the substantially vertical mounting bracket 20.

The bolts or screws 52 are utilized to frictionally retain the main body 12 of the mounting bracket 10 to the post 52 or stake 51. While T-posts 50 and stakes 51 are illustrated, the main body 12 can be used to other supporting structure including, but not limited to, tree trunks, tree branches, boards or any other suitable support structure. It is also contemplated that the main body 12 be driven into the ground to secure the mounting bracket 10 in a selected location.

The substantially horizontal mounting plate 16 is secured to the top end 44 of the main body 14 substantially at a center line CL of the substantially horizontal mounting plate 16. The substantially vertical mounting plate 20 extends downwardly from the distal end 62 of the substantially horizontal mounting plate 16. The substantially horizontal mounting plate 16 includes a first aperture 64 that is spaced from the main body 12 and the distal end 62 such that when a camera is secured to the substantially horizontal mounting plate 16, the substantially horizontal mounting plate 16 has sufficient structural integrity to retain the camera 11 thereto while providing sufficient space to manipulate a bolt to secure the camera 11 to the substantially horizontal mounting plate 16. As illustrated, the substantially horizontal mounting plate 16 has a rectangular or square cross sectional configuration. However other configurations of the top mounting plate 16 are also contemplated.

The substantially vertical mounting plate 20 includes an aperture 70 that is substantially centrally located and is configured to accept a bolt 72 that engages a threaded bus of the camera 11. The aperture 70 is spaced a sufficient distance from the main body 12 and the substantially horizontal mounting plate 16 to allow a bolt to be positioned through the aperture 70 and manipulated to secure the camera to the substantially vertical mounting plate 20. The aperture 70 is centrally located to provide sufficient structural integrity to secure the camera 11 to the substantially vertical mounting plate 20 with the bolt 72. As illustrated the substantially vertical mount plate 20 has a substantially square or rectangular configuration. However, other configurations of the substantially vertical mounting plate 20 are also contemplated.

The main body 12, the substantially horizontal mounting plate 16 and the substantially vertical mounting plate 20 are typically molded as a monolithic construction. It is also contemplated that the main body 12, the substantially horizontal mounting plate 16 and the substantially vertical mounting plate 20 be formed separately and secured together with an adhesive or other connecting mechanism.

A typical material of construction of the mounting bracket 10 is a polymer, such as high density polyethylene, that can be produced through a molding process. However, other materials of construction are also contemplated.

Referring to FIG. 3, a typical outdoor camera 11 is illustrated. The camera 11 includes a first threaded bus 22 in a back wall 24 and a second threaded bus 26 in the bottom wall 28. Referring to FIGS. 2 and 3, the camera 11 includes a lens 30 and a motion detector 32 in the front wall 34. A camera 11 having the first and second threaded busses 22 and 26 allows the camera to be secured in a number of positions that are conducive to capturing the movement of wildlife.

Utilizing the mounting bracket 10 with mounting plates 16 and 20 that are substantially perpendicular to each other along with a camera with orthogonal mounting busses 22 and 26 also for flexibility and in mounting the camera 11 to the mounting bracket 10 such that the camera 11 can be secured in any desired location. However, the present disclosure can also be utilized with a camera 11 with only one threaded bus.

Figure 4:
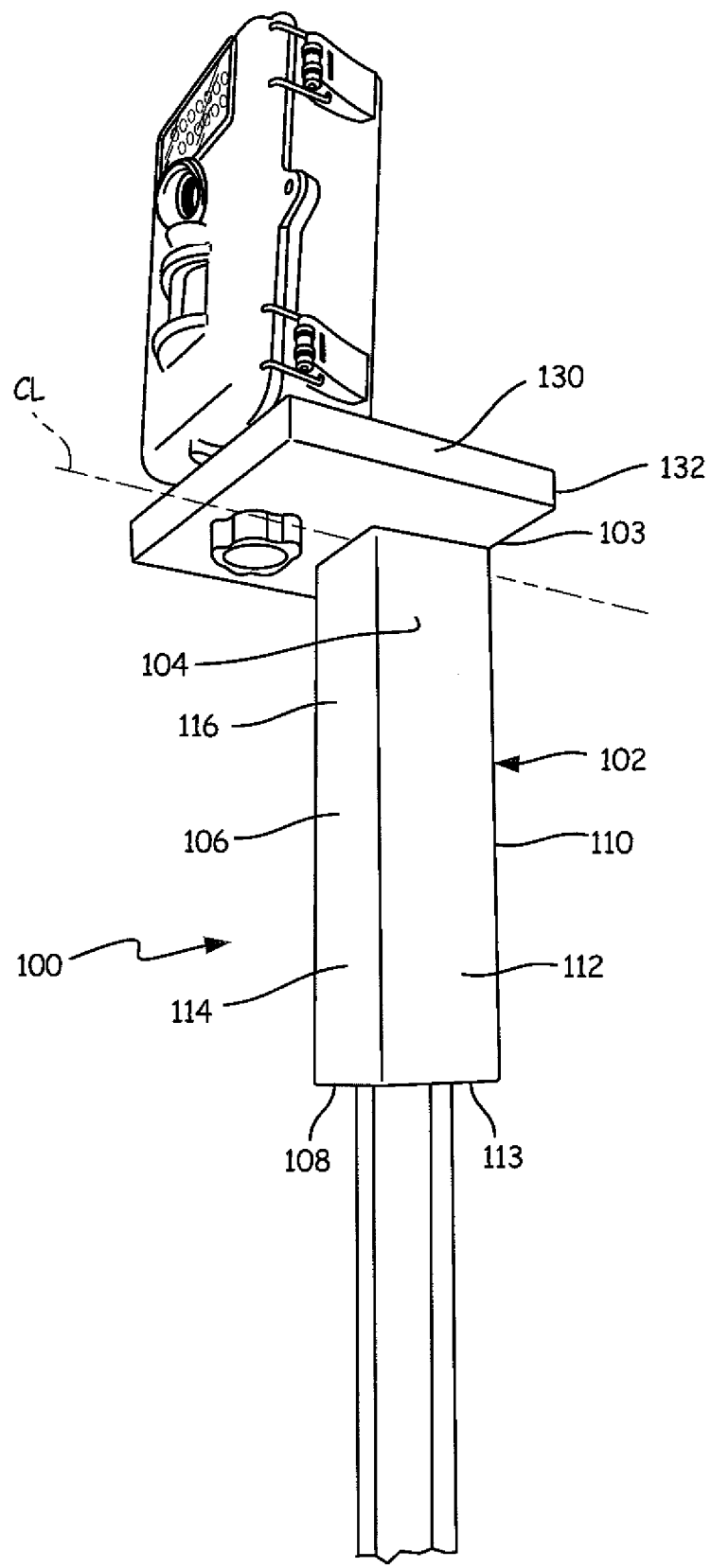
FIG. 4 is a perspective view of another embodiment of a mounting bracket having a camera secured thereto.
Figure 5:
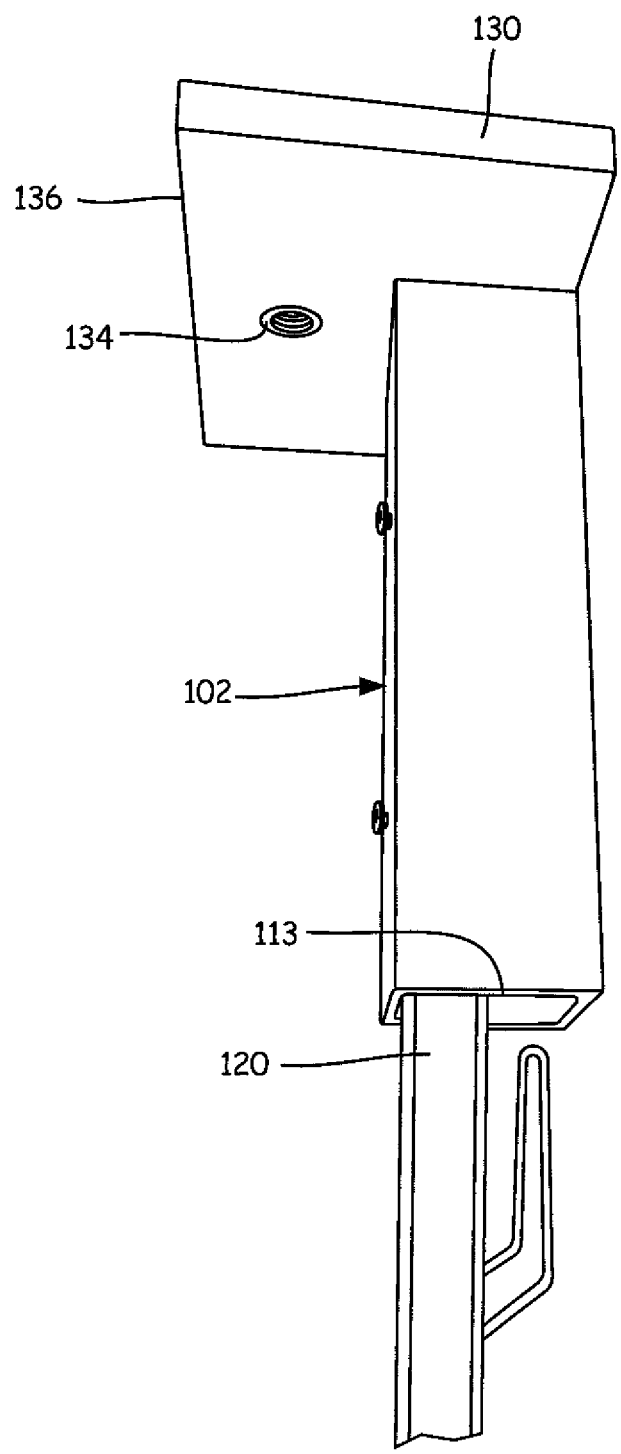
FIG. 5 is a perspective view of the other embodiment of the mounting bracket secured to a stake positioned along an exterior of the mounting bracket.
Figure 6:
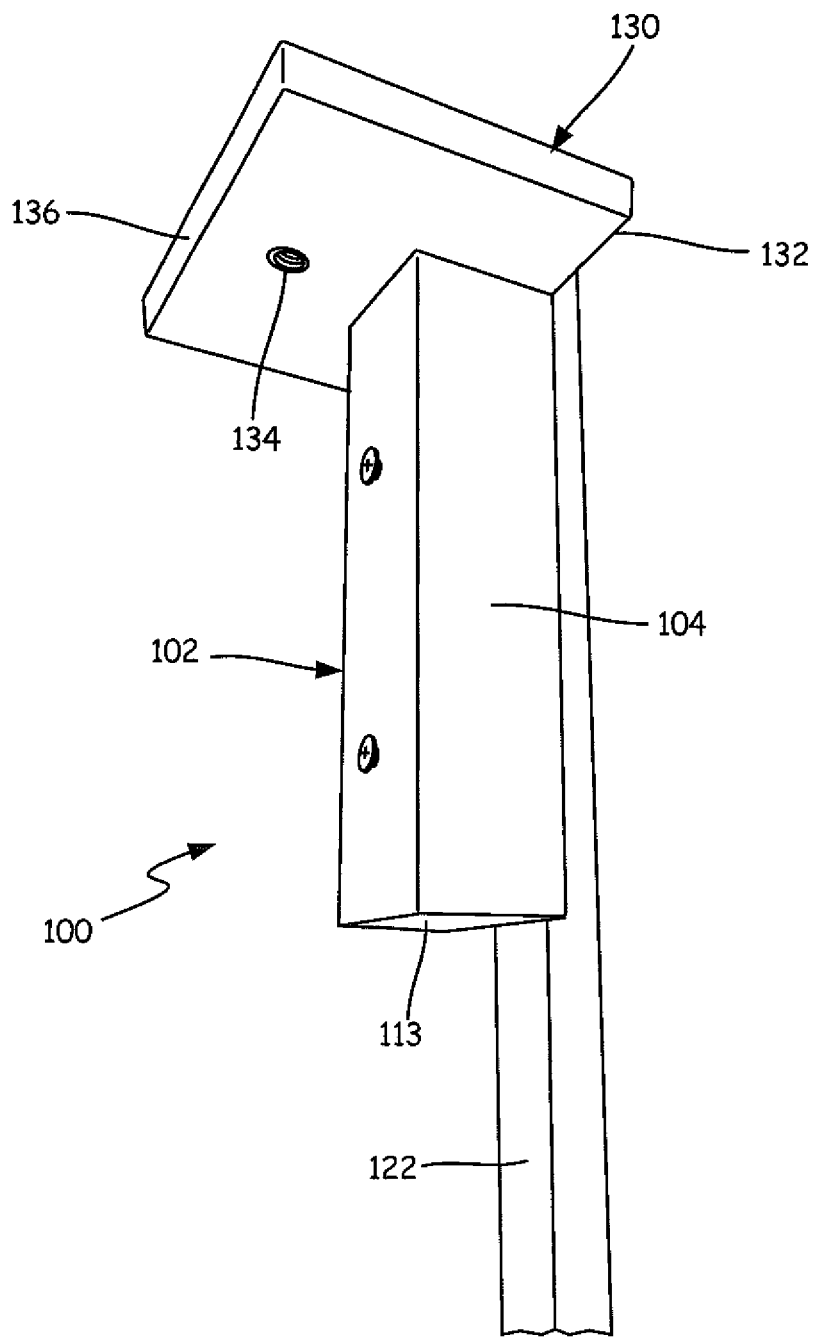
FIG. 6 is a perspective view of the other embodiment of the mounting bracket having a step in fence post positioned within an interior cavity of mounting bracket.

Referring to FIGS. 4-6, another embodiment of the mounting bracket is generally depicted at 100. The mounting bracket 100 includes a main body 102 having a similar configuration to the main body 12 where the main body includes a continuous side wall 104 with the front wall portion 106 and the back wall portion 110 connected with left and right side wall portions 108 and 112. The continuous side wall 104 has similar dimensions to that of the continuous side wall 30 such that the main body 104 includes a similarly configured interior cavity 113 to that of the 42. The main body 102 also includes apertures 114 and 116 in the front wall portions 106 and the back wall portion 110 that are configured to accept securing mechanisms such as, but not limited to, bolts, screws and nails, such that the mounting bracket 110 can be frictionally secured to a T-post as illustrated in FIG. 4 or a step in fence post 120 as illustrated in FIG. 5 or a stake 122 along the back wall portion 110, as illustrated in FIG. 6. However other support structures are also contemplated.

The mounting bracket 100 include a substantially horizontal mounting plate 130 extending from a top end 103 of the main body 102. The substantially horizontal mounting plate 130 is secured to the main body 102 along a proximal end 132 and includes an aperture 134 positioned a distance from the main body 102 and a distal edge 136 such that the substantially horizontal mounting plate 130 has sufficient structural integrity to retain a camera 140 thereto with a bolt 142. Similar to the mounting bracket 10, the back surfaces of the mounting plate 130 and the main body 102 are substantially even, and where the main body 102 is attached to the mounting plate 130 substantially along a center line. Again, the present disclosure is not limited to mount a camera, but rather the mounting brackets 10, 100 can be utilized with any suitable device.

The main body 102 and the substantially horizontal mounting plate 130 are typically molded as a monolithic construction. It is also contemplated that the main body 102 and the substantially horizontal mounting plate 130 be formed separately and secured together with an adhesive or other connecting mechanism.

A typical material of construction of the mounting bracket 100 is a polymer, such as high density polyethylene, that can be produced through a molding process. However, other materials of construction are also contemplated.

Figure 7:
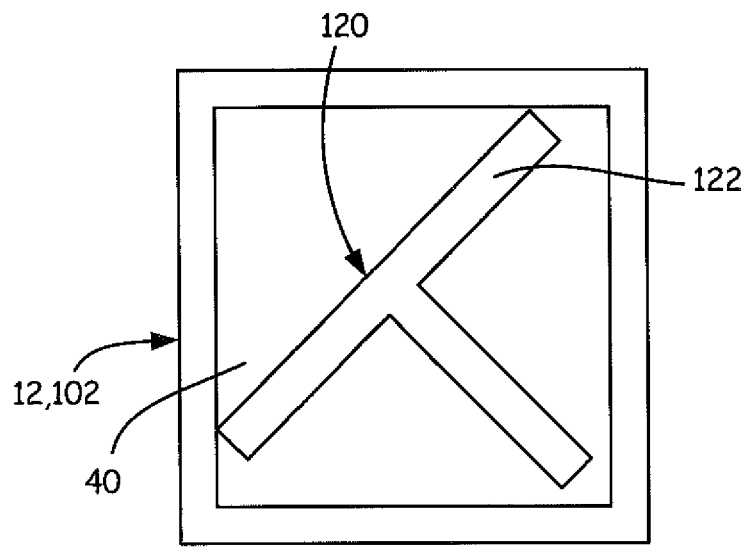
FIG. 7 is a schematic view of a main body of a mounting bracket positioned about a T-post in an unsecured position.
Figure 8:
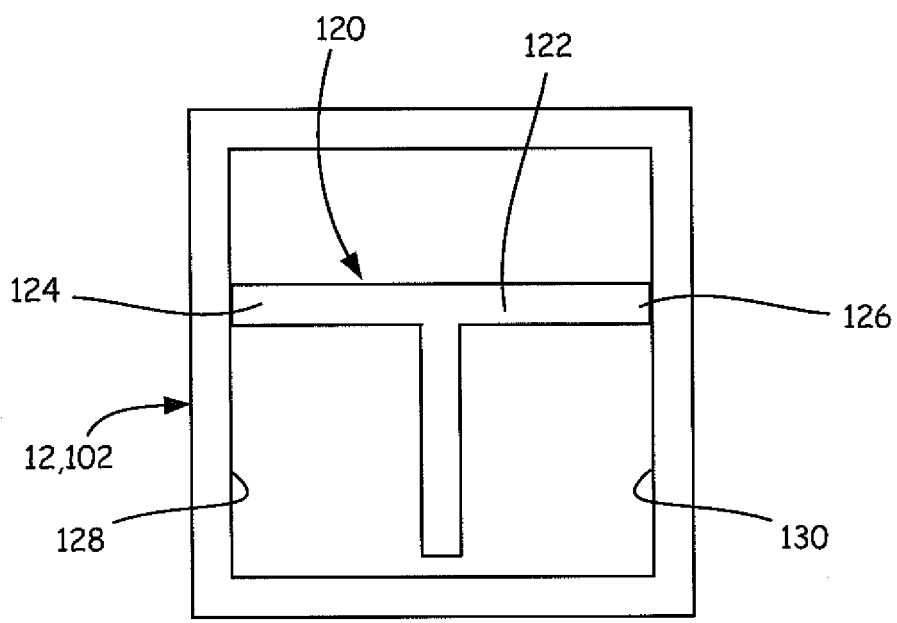
FIG. 8 is a schematic view of the main body of the mounting bracket securely retained to the T-post.

As illustrated in FIGS. 7 and 8, the main body 12 and 102 can include an internal cavity 40 that is configured to accept a T-post 120 and frictionally engage the T-post 120 such that the mounting bracket 10 and 100 can be secured to the T-post 120 without any tools or securing mechanisms. Referring to FIG. 7, the T-post 120, typically metal such as steel, is secured into the ground and the main body 12, 102 has a substantially square cross-section such that the main body 12, 102 is positionable about the T-post 120 such that a bar portion 122 is positioned diagonally from one corner to another corner of the internal cavity 40. Referring to FIG. 8, the main body 12, 102 is rotated a quarter turn such that edges 124, 126 of the bar portion 122 engage side surfaces 128, 130 of the internal cavity and are frictionally secured to the side surfaces 128, 130 such that the mounting bracket 10, 100 are retained to the T-post 120 without the need of tools or retaining mechanisms.

Figure 9:
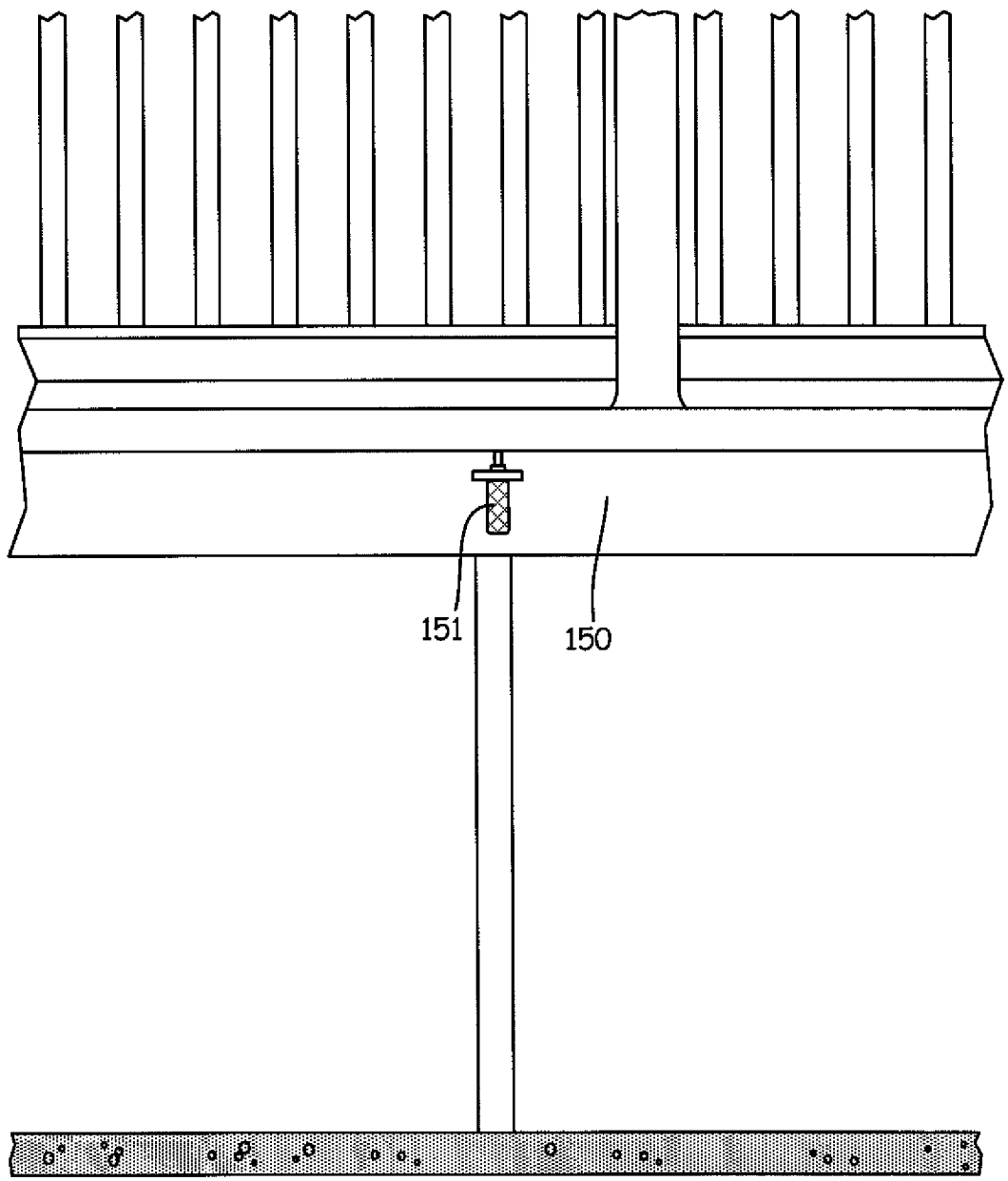
FIG. 9 is a perspective view of a speaker mounted to a deck truss with the mounting bracket.
Figure 10:
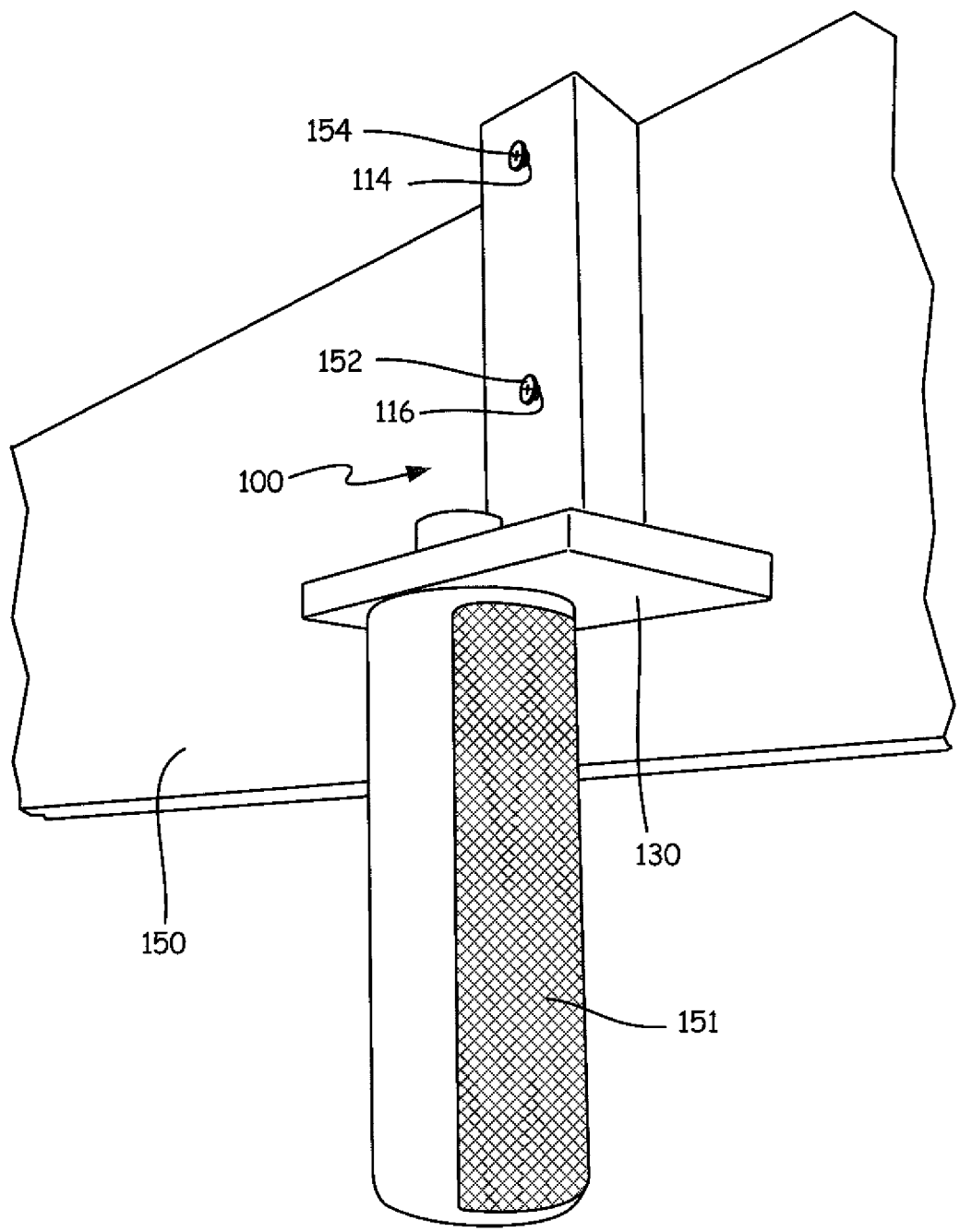
FIG. 10 is another perspective view of the speaker mounted to the deck truss with the mounting bracket.

Referring to FIGS. 9 and 10, the mounting bracket 100 is illustrated attached to a deck truss 150 with upper and lower screws 152 and 154 positioned through the apertures 114 and 116 in the main body 102. A speaker 151 is attached to the horizontal mounting plate 130 with a threaded bolt engaging a threaded bus (not shown) in the speaker. The speaker 151 is a wireless speaker that typically includes Bluetooth® technology for wireless transmission via a cellular telephone.

It should be understood that while a wireless speaker is illustrated, the mounting brackets 10 and 100 can be utilized to support any compatible device. Further, the mounting brackets 10 and 100 can be utilized to mount a speaker and or any other device in any location where the speaker or other device is desired, including, but not limited to, landscaping and/or a tree.

Figure 11:
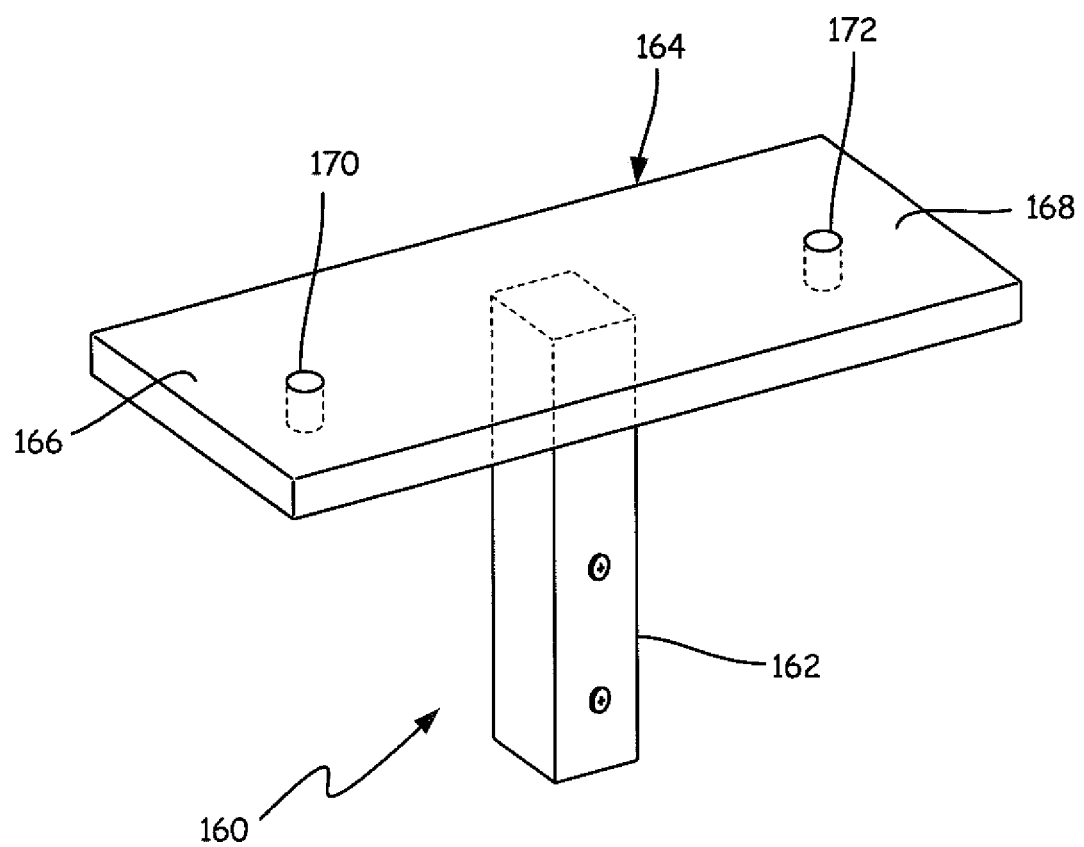
FIG. 11 is a perspective view of another embodiment of a mounting bracket.

Referring to FIG. 11, a mounting bracket 160 is illustrated wherein the mounting bracket 160 is configured to retain two devices (not shown) having securing mechanisms in a bottom surface of the device. The mounting bracket 160 is similar in configuration to that of the mounting bracket 100 where a main body 162, having a similar configuration to the main body 102, is substantially centrally located on a substantially horizontal mounting plate 164. The substantially horizontal mounting plate 164 includes a left portion 166 extending from a left side 161 of the main body 162 and a right portion 168 extending from a right side 163 of the main body 162.

The left portion 166 includes a through bore 170 spaced a distance from the main body 162 such that a securing mechanism can be positioned therethrough to secure a device to the left portion 166 in a manner previously discussed. The right portion includes a through bore 172 spaced from the main body 162 such that a securing mechanism can be positioned therethrough to secure a device to the right portion 168 in a manner previously discussed. As previously discussed, the mounting bracket 160 is configured to retain two devices having securing mechanisms in a bottom surface, such as, for instance, two cameras that are retained to the mounting bracket 160 and positioned in different directions.

Figure 12:
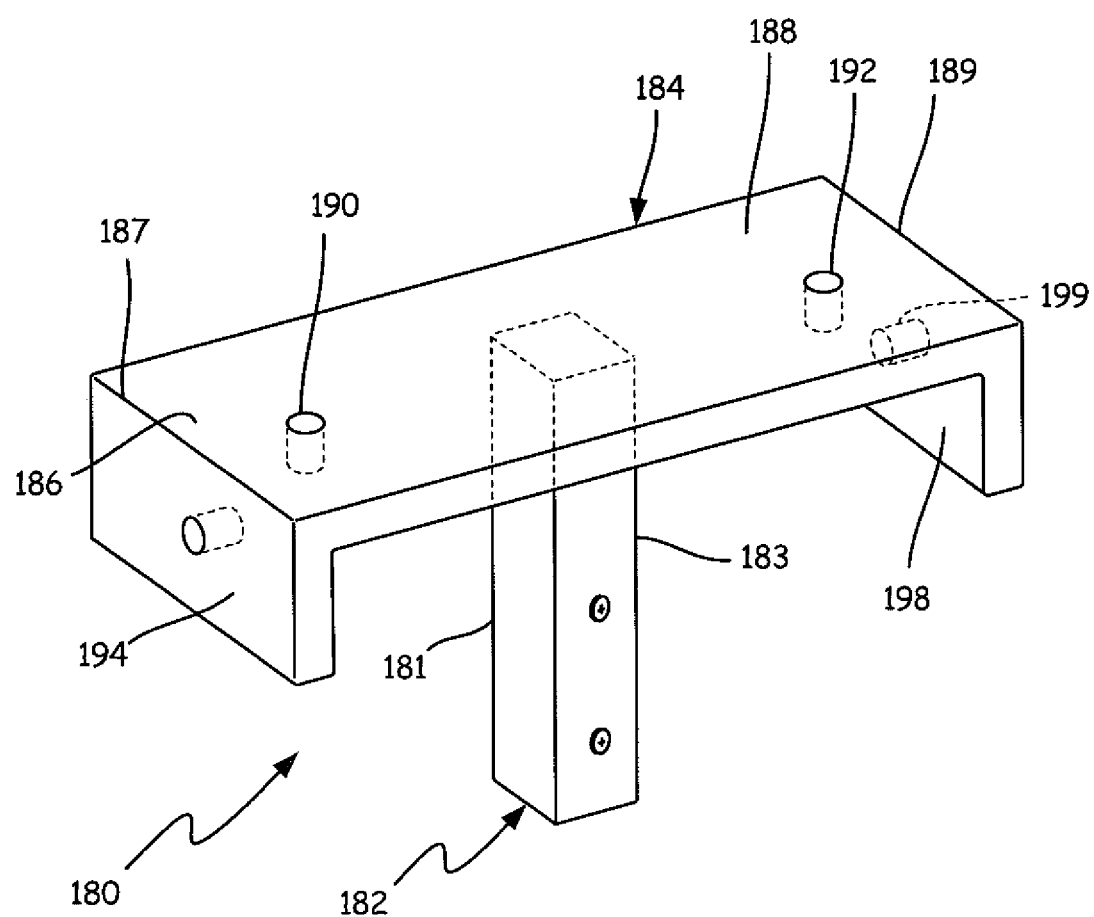
FIG. 12 is a perspective view of another embodiment of a mounting bracket.

Referring to FIG. 12, a mounting bracket 180 is illustrated to retain up to four devices such as, but not limited to cameras. The mounting bracket 180 is similar in configuration to that of the mounting bracket 10 and includes a substantially similar main body 182, as previously described herein. The mounting bracket 180 include a substantially horizontal mounting plate 184 where the main body 182 is attached substantially in a center of the substantially horizontal mounting plate 184. The substantially horizontal mounting plate 184 includes a left portion 186 extending from a left side 181 of the main body 182 and a right portion 188 extending from a right side 183 of the main body 182.

The left portion 186 includes a through bore 190 spaced a distance from the main body 182 such that a securing mechanism can be positioned therethrough to secure a device to the left portion 186 in a manner previously discussed. The right portion includes a through bore 192 spaced from the main body 182 such that a securing mechanism can be positioned therethrough to secure a device to the right portion 188 in a manner previously discussed. As previously discussed regarding the mounting bracket 160, the mounting bracket 180 is configured to retain two devices having securing mechanisms in a bottom surface, such as, for instance, two cameras that are retained to the mounting bracket 180 and positioned in different directions.

The mounting bracket 180 includes a left substantially vertical mounting plate 194 having substantially the same configuration as the substantially vertical mounting plate 20 of the mounting bracket 10. The left vertical mounting plate 194 extends from a distal edge 187 of the left portion 186 and includes a left mounting through bore 196 located a distance from the left portion 186. The mounting bracket 180 includes a right substantially vertical mounting plate 198 having substantially the same configuration as the substantially vertical mounting plate 20 of the mounting bracket 10. The right vertical mounting plate 198 extends from a distal edge 189 of the right portion 188 and includes a right mounting through bore 199 located a distance from the right portion 188. The left and right mounting through bores 196 and 199 allow devices having securing mechanisms in a side surface to be mounted to each of the left and right substantially vertical mounting plates 194 and 196.

The mounting bracket 180 can be utilized to mount up to four devices depending upon the location of the securing mechanism within the device. For instance the mounting bracket 180 can be utilized to secure two devices having securing mechanisms located in a side of the device to the left and right substantially vertical mounting plates 194 and 198. The mounting bracket 180 can also be used to mount two devices having securing mechanisms located in the bottom surface of the device to the left and right portions 184 and 186 of the substantially horizontal mounting plate 182 as previously described. The mounting bracket 180 can also be utilized to mount combinations of devices having securing devices located in the side of the devices and/or the bottom of the devices.

Although the present invention has been described with reference to preferred embodiments, workers skilled in the art will recognize that changes may be made in form and detail without departing from the spirit and scope of the invention.

The invention claimed is:

1. A mounting bracket comprising:
 a main body having a continuous side wall extending from a first end to a second end, where the continuous side wall defines an interior cavity configured to engage a support member therein wherein the continuous side wall includes at least one aperture configured to accept an engaging mechanism configured to frictionally engage the support member; and
 a substantially horizontal mounting plate attached to the first end of the main body, the substantially horizontal mounting plate having a first aperture spaced from the main body wherein the first aperture is configured to accept a retaining mechanism configured to engage a device.

2. The mounting bracket of claim 1 and further comprising:
 a substantially vertical mounting plate extending from the substantially horizontal mounting plate and wherein the substantially vertical mounting plate includes a second aperture spaced from the substantially horizontal mounting plate wherein the second aperture is configured to accept the retaining mechanism configured to engage the device.

3. The mounting bracket of claim 1 and wherein the substantially horizontal mounting bracket has a substantially rectangular perimeter having a front end and a back end wherein the main body is attached to the substantially horizontal mounting plate proximate the back end thereof.

4. The mounting bracket of claim 3 and wherein the main body comprised a back exterior surface and wherein the back exterior surface is substantially even with the back end of the substantially horizontal mounting plate.

5. The mounting bracket of claim 4 and wherein the main body is secured to the substantially horizontal mounting plate substantially along a center line thereof.

6. The mounting bracket of claim 3 and wherein the substantially vertical mounting plate is attached to the substantially horizontal mounting bracket proximate the front end thereof.

7. The mounting bracket of claim 1 and wherein the main body further comprises:
 upper aligned apertures configured to accept the engaging mechanism; and
 lower aligned apertures configured to accept the engaging mechanism.

8. The mounting bracket of claim 7 and further comprising:
 a substantially vertical mounting plate extending having an upper end and a lower end, wherein the upper end is secured to the substantially horizontal mounting plate and wherein the substantially vertical mounting plate includes a second aperture spaced from the substantially horizontal mounting plate wherein the second aperture is configured to accept the retaining mechanism configured to engage the device wherein the lower end of the substantially vertical mount plate is above the upper aligned aperture.

9. The mounting bracket of claim 1 and wherein the main body comprises:
   a front wall;
   a back wall; and
   first and second side walls that connect the front wall and the back wall wherein the front wall, the back wall and the first and second side walls define the interior cavity and wherein the interior cavity comprises a polygonal perimeter.

10. The mounting bracket of claim 1 and wherein the substantially horizontal mounting plate comprises:
    a first portion having the first aperture, wherein the first portion extends from a first surface of the main body; and
    a second portion having a second aperture, wherein the second portion extends from a second surface of the main body.

11. The mounting bracket of claim 10 and further comprising:
    a first substantially vertical mounting plate extending from the first portion a distance from the first surface of the main body wherein the first substantially vertical mounting plate includes a third aperture; and
    a second substantially vertical mounting plate extending from the second portion a distance from the second surface of the main body wherein the second substantially vertical mounting plate includes a fourth aperture.

12. The mounting bracket of claim 11 and wherein the main body, the substantially horizontal mounting plate and the substantially vertical mounting plate are of a monolithic construction.

13. A method of mounting a device in a selected outdoor location, the method comprising:
    locating a support;
    positioning a mounting bracket proximate the support wherein the mounting bracket comprises:
      a main body having a continuous side wall extending from a first end to a second end, wherein the continuous side wall defines an interior cavity configured to engage a support member therein wherein the continuous side wall includes at least one aperture configured to accept an engaging mechanism configured to frictionally engage the support member; and
      a substantially horizontal mounting plate attached to the first end of the main body, the substantially horizontal mounting plate having a first aperture spaced from the main body wherein the first aperture is configured to accept a retaining mechanism configured to engage a device;
    securing the main body to the support; and
    attaching the device to the mounting plate by positioning the retaining mechanism through the first aperture and frictionally securing the device to the substantially horizontal mounting plate.

14. The method of claim 13 and wherein locating the support comprises locating a T-post.

15. The method of claim 14 and wherein securing the main body to the support comprises:
    positioning the main body about the T-post; and
    rotating the main body to frictionally engage edges of the T-post.

16. The method of claim 13 and wherein locating the support comprises locating a post, a tree limb, a tree trunk or a board.

17. The method of claim 16 and wherein securing the main body to the support comprising:
    positioning the main body proximate the post, the tree limb, the tree trunk or the board; and
    positioning an engaging mechanism through the at least one aperture and into the post, the tree limb, the tree trunk or the board.

18. The method of claim 13 and wherein the support comprises a post or a tree limb.

19. The method of claim 18 and wherein securing the main body to the support comprises:
    positioning the main body abut the post or the tree limb; and
    positioning an engaging mechanism through the at least one aperture and into the post, or the tree limb.

20. The method of claim 13 and wherein the device comprises a camera.

* * * * *